United States Patent
Plante et al.

(10) Patent No.: US 11,465,277 B2
(45) Date of Patent: Oct. 11, 2022

(54) CABLE-DRIVEN SYSTEM WITH MAGNETORHEOLOGICAL FLUID CLUTCH APPARATUSES

(71) Applicant: SOCIETE DE COMMERCIALISATION DES PRODUITS DE LA RECHERCHE APPLIQUÉE SOCPRA SCIENCES ET GENIE S.E.C., Sherbrooke (CA)

(72) Inventors: Jean-Sebastien Plante, Sherbrooke (CA); Marc Denninger, Sherbrooke (CA); Patrick Chouinard, Sherbrooke (CA); Guifre Julio, Sherbrooke (CA); Joel Viau, Boucherville (CA); Pascal Larose, Sherbrooke (CA)

(73) Assignee: SOCIETE DE COMMERCIALISATION DES PRODUITS DE LA RECHERCHE APPLIQUEE SOCPRA SCIENCES ET GENIE S.E.C., Sherbrooke (CA)

( * ) Notice: Subject to any disclaimer, the term of this patent is extended or adjusted under 35 U.S.C. 154(b) by 477 days.

(21) Appl. No.: 16/701,780

(22) Filed: Dec. 3, 2019

(65) Prior Publication Data

US 2020/0101595 A1 Apr. 2, 2020

Related U.S. Application Data

(63) Continuation of application No. 15/551,197, filed as application No. PCT/CA2016/050191 on Feb. 25, 2016, now Pat. No. 10,525,588.

(Continued)

(51) Int. Cl.
*B25J 9/10* (2006.01)
*F16D 37/02* (2006.01)
(Continued)

(52) U.S. Cl.
CPC ............ *B25J 9/104* (2013.01); *B25J 9/0078* (2013.01); *F16D 37/02* (2013.01); *F16D 48/06* (2013.01);
(Continued)

(58) Field of Classification Search
None
See application file for complete search history.

(56) References Cited

U.S. PATENT DOCUMENTS 2,850,839 A   2/1955  Bogart
5,207,114 A   5/1993  Salisbury, Jr. et al.
(Continued)

FOREIGN PATENT DOCUMENTS

CN   101983297 A   3/2011
CN   202625690 U   12/2012
(Continued)

OTHER PUBLICATIONS

Li, Wenjun, "Design and Development of Magneto-Rheological Actuators with Application in Mobile Robotics", Electronic Thesis and Dissertation Repository, May 2014.
(Continued)

*Primary Examiner* — Timothy Hannon
(74) *Attorney, Agent, or Firm* — Norton Rose Fulbright Canada LLP

(57) ABSTRACT

A tensioning set comprises an output member. A magnetorheological fluid clutch apparatus is configured to receive a degree of actuation (DOA) and connected to the output member, the magnetorheological fluid clutch apparatus being actuatable to selectively transmit the received DOA through the output member by controlled slippage. A tensioning member is connected to the output member so as to be pulled by the output member upon actuation of the magnetorheological fluid clutch apparatus, a free end of the
(Continued)

tensioning member adapted to exert a pulling action transmitted to an output when being pulled by the output member. The tensioning set, or a comparable compressing set, may be used in systems and robotic arms. A method for controlling movements of an output driven by the tensioning set or compressing set is also provided.

10 Claims, 14 Drawing Sheets

Related U.S. Application Data

(60) Provisional application No. 62/120,556, filed on Feb. 25, 2015.

(51) Int. Cl.
*B25J 9/00* (2006.01)
*F16D 48/06* (2006.01)
*F16D 37/00* (2006.01)

(52) U.S. Cl.
CPC ...... *F16D 37/008* (2013.01); *F16D 2037/001* (2013.01); *F16D 2037/004* (2013.01); *F16D 2500/10475* (2013.01); *F16D 2500/70426* (2013.01)

(56) References Cited

U.S. PATENT DOCUMENTS

| | | |
|---|---|---|
| 5,248,113 A | 9/1993 | Daniels |
| 5,710,870 A | 1/1998 | Ohm et al. |
| 5,732,791 A | 3/1998 | Pinkos |
| 5,749,807 A | 5/1998 | Webb |
| 6,047,800 A | 4/2000 | Kosik |
| 6,113,515 A * | 9/2000 | Salecker ............... F16D 48/064 |
| 8,060,250 B2 | 11/2011 | Reiland et al. |
| 2003/0136626 A1 | 7/2003 | Ciaramitaro |
| 2004/0087418 A1 | 5/2004 | Eldridge |
| 2010/0280659 A1 | 3/2010 | Abdallah et al. |
| 2011/0045932 A1 | 2/2011 | Fauteux |
| 2011/0066088 A1 | 3/2011 | Little |
| 2013/0047772 A1 | 2/2013 | Shafer et al. |
| 2014/0277739 A1 | 3/2014 | Kombluh et al. |
| 2014/0137679 A1 | 5/2014 | Pittini et al. |

FOREIGN PATENT DOCUMENTS

| | | |
|---|---|---|
| CN | 103836145 A | 6/2014 |
| WO | 2009078844 A1 | 6/2009 |
| WO | 2013022833 A1 | 8/2012 |

OTHER PUBLICATIONS

Shafer, Alex et al., "Development of High Performance Intrinsically Safe 3-DOF Robot", IEEE International Conference on Robotics & Automation (ICRA), 2014, China.

* cited by examiner

CABLE-DRIVEN SYSTEM WITH MAGNETORHEOLOGICAL FLUID CLUTCH APPARATUSES

CROSS-REFERENCE TO RELATED APPLICATION

The present application is a continuation of U.S. patent application Ser. No. 15/551,197 filed on Aug. 15, 2017, which is a 371 of International Application No. PCT/CA2016/050191 filed on Feb. 25, 2016, and claiming priority of U.S. Patent Application No. 62/120,556, filed on Feb. 25, 2015.

FIELD OF THE APPLICATION

The present application relates generally to magnetorheological (MR) fluid clutch apparatuses, and more particularly, to cable-driven systems using such apparatuses.

BACKGROUND OF THE ART

State-of-the-art distributed power devices rely on hydraulics or electromagnetic actuation. Hydraulic actuation is reliable towards mechanical jam, but has fundamentally limited dynamic response and efficiency. Furthermore, implementation of hydraulic systems into commercial applications may be problematic as hydraulics are prone to leakage, leading to increased maintenance costs. Moreover, hydraulic actuation is hardware intensive.

Electromagnetic actuation offers a clean alternative to hydraulic actuation. For high dynamic applications, the most common form of electromechanical actuation is found in direct-drive motors, which are prohibitively heavy. Device weight can be considerably reduced by providing a reduction ratio between the motor and the end-effector. Indeed, when coupled to reduction gearboxes, electromechanical actuators are lighter and less expensive than direct drive solutions, but their high output inertia, friction and backlash may diminish their dynamic performance.

Magnetorheological (MR) fluid clutch apparatuses are known as useful apparatuses for transmitting motion from a drive shaft with precision and accuracy, among other advantages, which could enhance the performance of electromechanical actuation systems.

SUMMARY OF THE APPLICATION

It is therefore an aim of the present disclosure to provide a novel cable-driven system using a magnetorheological fluid for torque transmission.

Therefore, in accordance with a first embodiment of the present application, there is provided a tensioning set comprising: an output member; a magnetorheological fluid clutch apparatus configured to receive a degree of actuation (DOA) and connected to the output member, the magnetorheological fluid clutch apparatus being actuatable to selectively transmit the received DOA through the output member by controlled slippage; and a tensioning member being connected to the output member so as to be pulled by the output member upon actuation of the magnetorheological fluid clutch apparatus, a free end of the tensioning member adapted to exert a pulling action transmitted to an output when being pulled by the output member.

Further in accordance with the first embodiment, the output member and the tensioning member are any one of a wheel or pulley and cable or tendon, and a chainring and chain.

Still further in accordance with the first embodiment, a hydraulic transmission is associated with the tensioning member.

Still further in accordance with the first embodiment, the hydraulic transmission comprises a master cylinder connected to the tensioning member to convert the pulling action into hydraulic pressure, a slave cylinder adapted to transmit the hydraulic pressure to the output, and an hydraulic hose between the master cylinder and the slave cylinder for transmission of hydraulic pressure therebetween.

Still further in accordance with the first embodiment, the hydraulic transmission is located between an end of the tensioning member connected to the output member, and the free end of the tensioning member.

In accordance with a second embodiment of the present disclosure, there is provided a system comprising: at least one of the tensioning set as described above; and means configured to provide a force on the output antagonistic to a transmission of the pulling action of the at least one tensioning set on the output.

Further in accordance with the second embodiment, the means for providing the pulling action is another one of the tensioning set.

Still further in accordance with the second embodiment, all of the tensioning sets are configured to share a single power source providing the DOA.

Still further in accordance with the second embodiment, the means for providing the force is a biasing member.

Still further in accordance with the second embodiment, a brake system is adapted to lock the output in a desired position while not in a free state mode.

Still further in accordance with the second embodiment, the output is constrained to movement along at least one degree of freedom (DOF); the power source providing the DOA, the DOA being a rotational DOA; whereby movement of the output in the at least one DOF is actuated by controlling an actuation of the magnetorheological fluid clutch apparatus of the at least one tensioning set.

Still further in accordance with the second embodiment, the output is a mechanism formed of bodies interconnected by joints, the output being constrained by a number of the tensioning sets at least equal to DOF+1-Number of biasing members, DOF being the number of degrees of freedom of the mechanism.

Still further in accordance with the second embodiment, the output is a joystick.

Still further in accordance with the second embodiment, the output is a friction clutch.

In accordance with a third embodiment of the present disclosure, there is provided a robotic arm comprising: at least two bodies, with a base one of the bodies configured to be connected to a base, and an end one of the bodies configured to support a tool; at least one kinematic joint serially interconnecting the bodies, and providing at least one degree of freedom (DOF) between the bodies; and at least two of the tensioning sets as described above, the tensioning sets exerting antagonistic pulling actions transmitted to the at least one kinematic joint; whereby movement of the bodies relative to one another in the at least one DOF is actuated by controlling an actuation of the magnetorheological fluid clutch apparatuses of the tensioning sets.

Further in accordance with the third embodiment, each of the at least one kinematic joint between each serially connected pair of the bodies provides at least two DOFs, the robotic arm being constrained by a number of the tensioning sets at least equal to DOF+1-Number of biasing members, DOF being the number of degrees of freedom of an assembly of the bodies and the kinematic joints.

Still further in accordance with the third embodiment, the slave cylinders are connected to the bodies, and wherein the master cylinders and the magnetorheological fluid clutch apparatus are connected to a base.

Still further in accordance with the third embodiment, all of the tensioning sets are configured to share a single power source mounted to the base.

Still further in accordance with the third embodiment, the at least one kinematic joint comprises two rotational joints sharing a common carriage, one of the two rotational joints rotationally connected to a first of the bodies, and the other of the two rotational joints rotationally connected to a second of the bodies.

In accordance with a fourth embodiment, there is provided a compressing set comprising: a magnetorheological fluid clutch apparatus configured to receive a degree of actuation (DOA), the magnetorheological fluid clutch apparatus being actuatable to selectively transmit the DOA by controlled slippage; a master cylinder connected to magnetorheological fluid clutch apparatus to convert actuation thereof into hydraulic pressure, a slave cylinder adapted to transmit the hydraulic pressure to an output; and an hydraulic hose between the master cylinder and the slave cylinder for transmission of hydraulic pressure therebetween.

In accordance with a fifth embodiment of the present disclosure, there is provided a system comprising: at least one of the compressing set described above; and means configured to provide a force on the output antagonistic to a transmission of the hydraulic pressure of the at least one compressing set on the output.

Further in accordance with the fifth embodiment, the means for providing the force is another one of the compressing set.

Still further in accordance with the fifth embodiment, all of the compressing sets are configured to share a single power source providing the DOA.

Still further in accordance with the fifth embodiment, the means for providing the force is a biasing member.

Still further in accordance with the fifth embodiment, a brake system is adapted to lock the output in a desired position while not in a free state mode.

Still further in accordance with the fifth embodiment, the output, the output being constrained to movement along at least one degree of freedom (DOF); the power source providing the DOA, the DOA being a rotational DOA; whereby movement of the output in the at least one DOF is actuated by controlling an actuation of the magnetorheological fluid clutch apparatus of the at least one compressing set.

Still further in accordance with the fifth embodiment, the output is a mechanism formed of bodies interconnected by joints, the output being constrained by a number of the compressing sets at least equal to DOF+1-Number of biasing members, DOF being the number of degrees of freedom of the mechanism.

In accordance with a sixth embodiment of the present disclosure, there is provided a method for controlling movements of an output in at least one degree of freedom (DOF), comprising: obtaining at least one degree of actuation (DOA); controlling a slippage of a first magnetorheological fluid clutch apparatus to convert at least part of the DOA into an action on the output in a first direction of the at least one DOF with a first member; and controlling a slippage of at least a second magnetorheological fluid clutch apparatus to convert at least part of the DOA into an action on the output in a second direction of the at least one DOF with a second member, antagonistically to the action by the first magnetorheological fluid clutch apparatus.

Still further in accordance with the sixth embodiment, obtaining the at least one DOA comprises obtaining the at least one DOA from a common power source for all of the magnetorheological fluid clutch apparatuses.

Still further in accordance with the sixth embodiment, controlling the slippage of the first magnetorheological fluid clutch apparatus comprises converting at least part of the DOA into a pulling action on the output with the first member being a tensioning member.

Still further in accordance with the sixth embodiment, controlling the slippage of the second magnetorheological fluid clutch apparatus comprises converting at least part of the DOA into a pulling action on the output with the second member being another tensioning member.

Still further in accordance with the sixth embodiment, controlling the slippage of the first magnetorheological fluid clutch apparatus comprises converting at least part of the DOA into a pushing action on the output with the first member being a compressing member.

Still further in accordance with the sixth embodiment, controlling the slippage of the second magnetorheological fluid clutch apparatus comprises converting at least part of the DOA into a pushing action on the output with the second member being another compressing member.

Still further in accordance with the sixth embodiment, the output has more than one DOF and wherein controlling the slippage of the magnetorheological fluid clutch apparatuses comprises antagonistically opposing the actions of the magnetorheological fluid clutch apparatuses for each of the DOFs.

DESCRIPTION OF THE PREFERRED EMBODIMENTS

Figure 1:
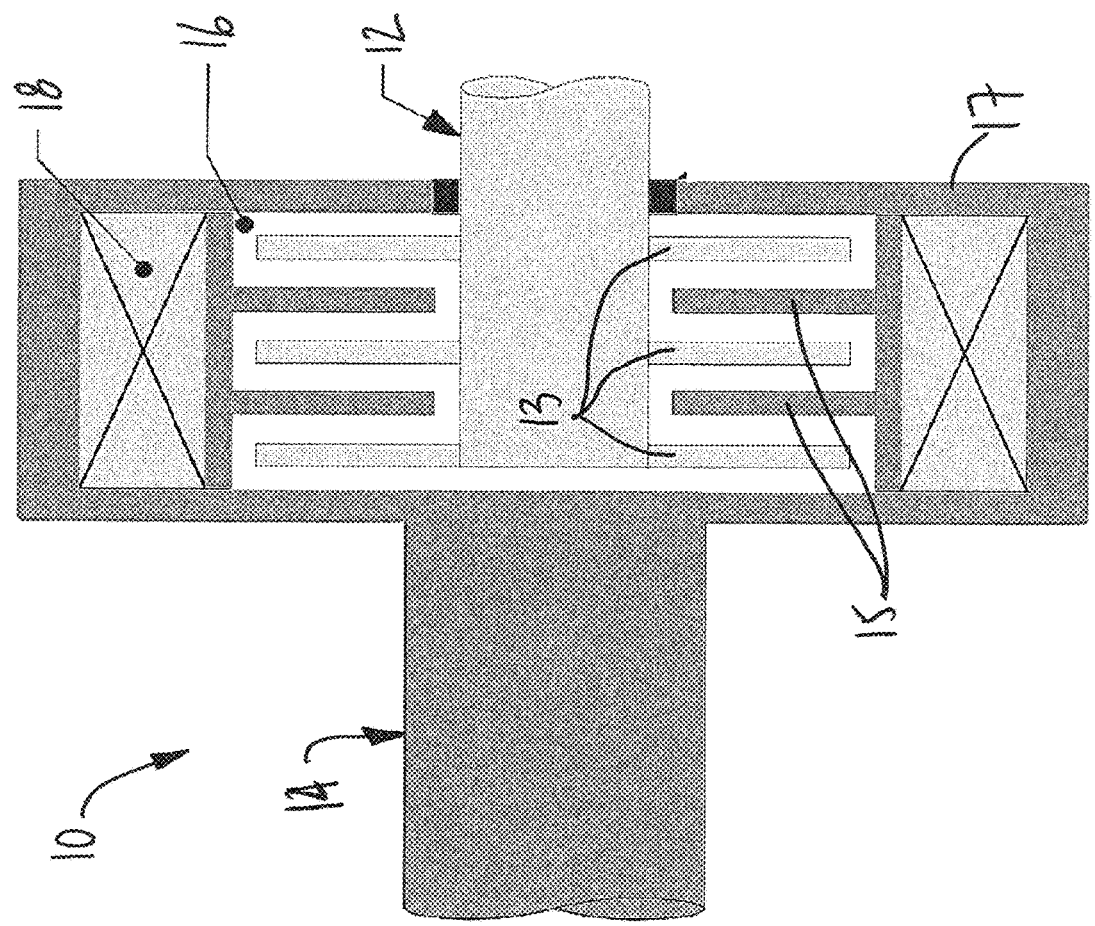
FIG. 1 is a schematic view of a magnetorheological fluid clutch apparatus used in cable-driven systems of the present disclosure.

Referring to the drawings and more particularly to FIG. 1, there is illustrated a generic magnetorheological (MR) fluid clutch apparatus 10 configured to provide a mechanical output force based on a received input current. The MR fluid clutch apparatus 10 of FIG. 1 is a simplified representation of a MR fluid clutch apparatus that may be used in the systems described hereinafter. The MR fluid clutch apparatus that is used in the systems described hereinafter may have additional components and features, such as drums, redundant electromagnets, MR fluid expansion systems, etc.

The MR fluid clutch apparatus 10 has a driving member 12 with radial disks 13, this assembly also known as input rotor. The MR fluid clutch apparatus 10 also has a driven member 14 with annular plates 15 intertwined with the radial disks 13 to define an annular chamber(s) filled with an MR fluid 16, the annular chamber being delimited by a casing 17 that is integral to the driven member 14. The assembly of the driven member 14 and annular plates 15 is also known as the output rotor. In the example of FIG. 1, the driving member 12 may be an input shaft in mechanical communication with a power input, and driven member 14 may be in mechanical communication with a power output (i.e., force output, torque output). MR fluid 16 is a type of smart fluid that is composed of magnetisable particles disposed in a carrier fluid, usually a type of oil. When subjected to a magnetic field, the fluid may increase its apparent viscosity, potentially to the point of becoming a viscoplastic solid. The apparent viscosity is defined by the ratio between the operating shear stress and the operating shear rate of the MR fluid comprised between opposite shear surfaces—i.e., that of the radial disks 13 on the drive side, and that of the annular plates 15 and of the walls of the casing 17 in the annular chamber 17. The magnetic field intensity mainly affects the yield shear stress of the MR fluid. The yield shear stress of the fluid when in its active ("on") state may be controlled by varying the magnetic field intensity produced by electromagnet 18 integrated in the casing 17, i.e., the input current, via the use of a controller. Accordingly, the MR fluid's ability to transmit force can be controlled with the electromagnet 18, thereby acting as a clutch between the members 12 and 14. The electromagnet 18 is configured to vary the strength of the magnetic field such that the friction between the members 12 and 14 is low enough to allow the driving member 12 to freely rotate with the driven member 14 and vice versa.

Figure 2:
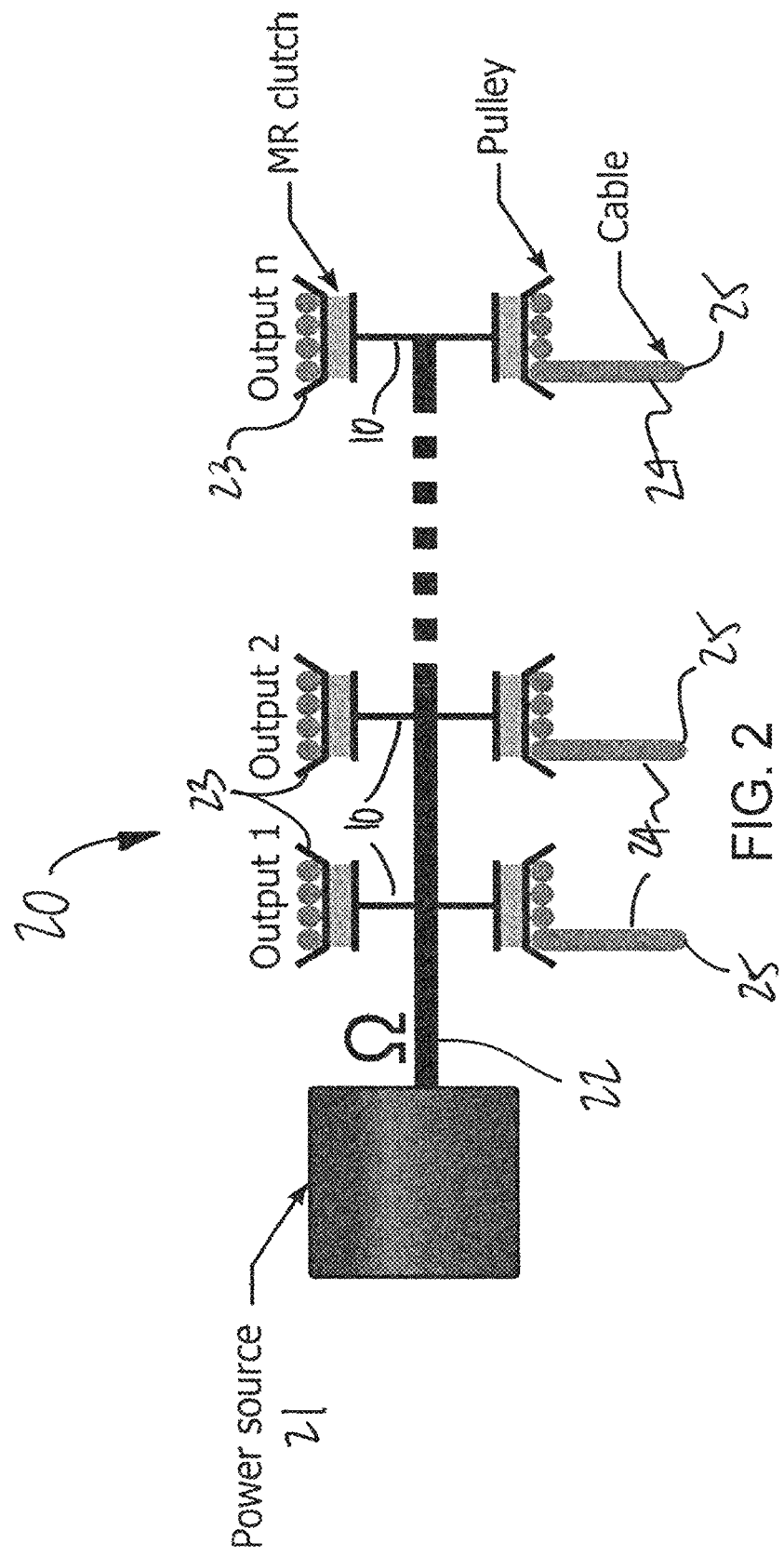
FIG. 2 is a schematic view of a power distribution arrangement in a cable-driven system in accordance with the present disclosure, using magnetorheological fluid clutch apparatuses.

Referring to FIG. 2, a cable-driven system in accordance with the present disclosure is generally shown at 20. The cable-driven system 20 has n MR fluid clutch apparatuses 10 receiving a torque input from a single power source 21 via a common power shaft 22 driven by the power source 21. For example, the power source 21 may be an electric motor, although other types of power sources may be used, such as hydraulic motors to name one among numerous other examples.

The MR fluid clutch apparatuses 10 are each equipped with an output member 23 upon which is mounted a cable 24, to form a tensioning set. The output member may practically be connected to the driven member 14 (FIG. 1) of the MR fluid clutch apparatuses 10 so as to rotate therewith. However, the output member may also have mechanisms between the driven member 14 and the output member 23 instead of being a direct drive. For example, the output member 23 may incorporate a reduction gearbox. The expression "output wheel" is used as an encompassing expression for equivalent parts, such as a pulley, a chainring, a sprocket, a nut, a screw, lever arm, etc. Likewise, the expression "cable" is used as an encompassing expression for equivalent parts, such as a tendon, rope, belt, chain, and like tensioning members. The selection of the type of cable is based on the type of output wheel. The cable 24 has an end attached to the output wheel 23, a free end 25 attached to an output component, with a length of the cable being wound about the output wheel 23. A rotation of the output wheel 23, for instance as driven by the driven member 14 (FIG. 1), may wind additional cable length onto the output wheel 23, resulting in a pulling action at the free end of the cable 24. A pulling action on the free end 25 may alternatively result in an unwinding of the cable 24 from the output wheel 23, for instance when the MR fluid clutch apparatus 10 is in a slippage condition, i.e., when the pulling action on the free end 25 exceeds the force produced by the driven member 14. The cable-driven system 20 has n outputs for a single degree of actuation. Using continuous-slippage MR fluid clutch apparatuses 10 as tensioners in the cable-driven system 20 allows torque distribution from a single power source 21 amongst many outputs in order to drive possibly multiple DOFs. Although the MR fluid clutch apparatuses 10 can only produce torque in the direction they are being driven by the power source, this is not an issue in the case of cable-driven systems because of the cables' intrinsic inability to effectively transmit compressive loads.

Figure 3:
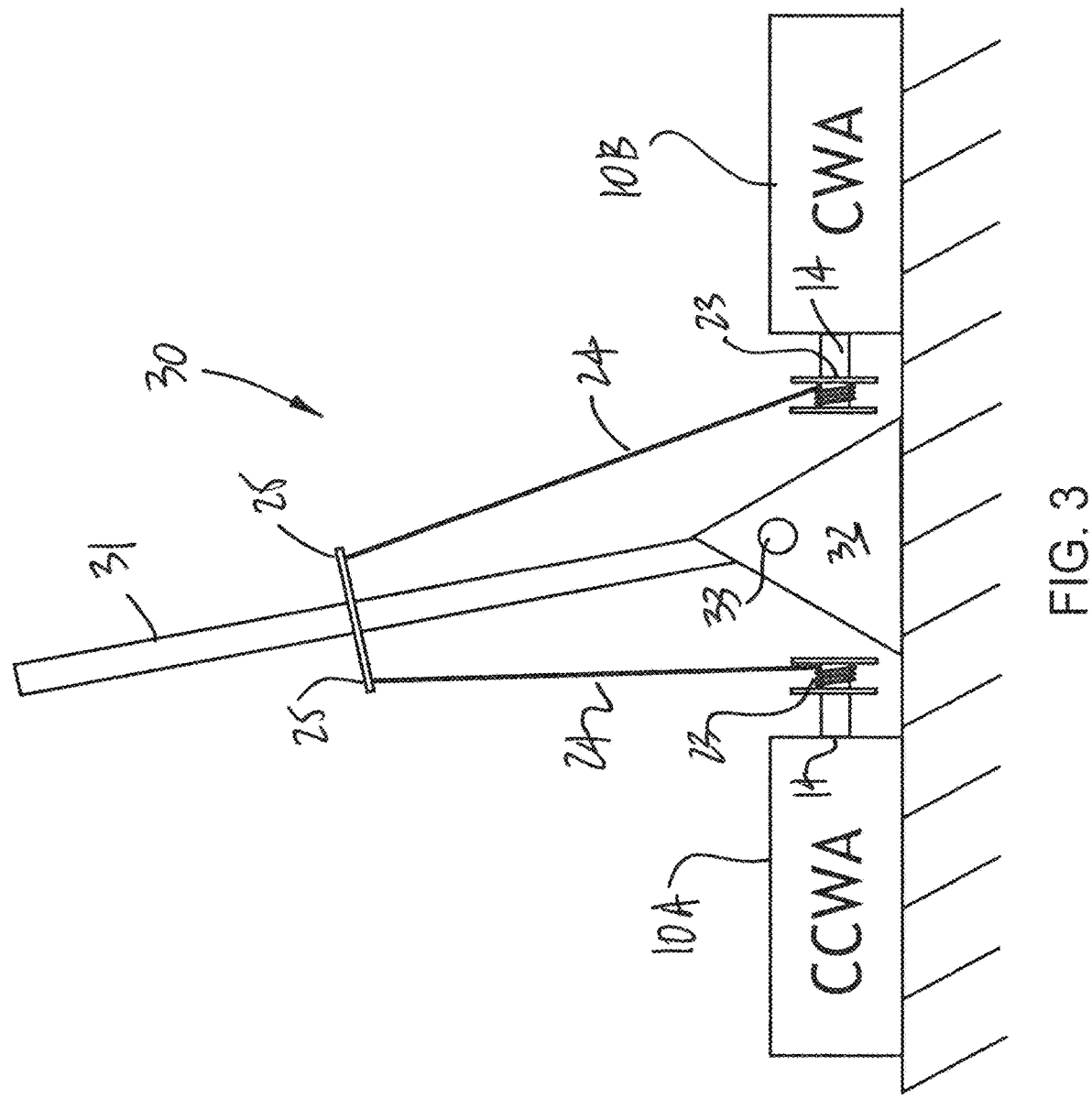
FIG. 3 is a schematic view of a cable-driven system using a common power source with a pair of magnetorheological fluid clutch apparatuses for antagonistic displacement of an end effector.

One particular embodiment of the cable-driven system of FIG. 2 is shown as 30 in FIG. 3. As the cable-driven system 30 has components in common with the cable-driven system 20 of FIG. 2, like components will bear like reference numerals. The cable-driven system 30 has a pair of the MR fluid clutch apparatuses, one of which is shown at 10A and the other of which is shown as 10B, the apparatuses 10A and 10B being connected to a common power source (not shown) as it is the case for the system 20 of FIG. 2. The MR fluid clutch apparatuses 10A and 10B are connected via cables 24 to a common end effector 31. The common end effector 31 is illustrated as being a pivoting arm, mounted to a base 32 by pivot 33. Accordingly, the end effector 31 is movable in one rotational degree of freedom (DOF). In spite of being driven by the common power source, the MR fluid clutch apparatuses 10A and 10B provide antagonistic pulling actions on the end effector 31, to enable reciprocating movement. Also, although the end effector 31 is shown as being movable in one rotational DOF, the end effector 31 could be connected to the base 32 by a translation joint, whereby the system 30 would provide a translational DOF. It is also considered to provide a single MR fluid clutch apparatus 10 and thus a single cable 24 connected to the end effector 31, with an antagonistic force provided by a biasing member such as a linkage, spring, gravity, other type of actuators, etc (not shown). The biasing member may also include more complex mechanisms, such as a servo system, linear actuators, etc. In other words, any mechanism capable of opposing an antagonistic force to the end effector 31 may be used. This is applicable for given embodiments provided below as well.

In typical antagonistic cable-driven actuation systems, one actuator per degree-of-freedom (DOF) is generally used. Each actuator must therefore be designed to satisfy the maximum load for the degree-of-freedom it is driving. The DOF is actuated by two actuators because of the cables' inability to transmit compressive loads. Each DOF is hence actuated by two antagonistic actuators and generally only one is being activated at a time because of their opposing effect. For example, if a load is required to be produced in the clockwise direction, a clockwise actuator (CWA) is powered and the counter-clockwise actuator (CCWA) is unpowered and vice-versa if the load is required to be produced in the other direction.

In contrast, when centralizing the power source 21 (FIG. 2) in the system 30 of FIG. 3, the resulting system may lead to a compact and lightweight design. Moreover, since the continuous-slippage MR fluid clutch apparatuses uncouple the inertia of the power source 21 from the end effector 31, a lightweight power source, such as a high-speed electric motor coupled with a high-ratio reduction gearbox can be used without impacting the system's dynamic performance. Furthermore, the required load for the power source 21 can be tailored according to the application, leading to further weight reduction. For example, as the cable-driven system 30 utilizes a purely antagonistic actuation arrangement, the power source 21 is not required to produce the sum of the load capacity of both continuous-slippage MR fluid clutch apparatuses 10 it is driving, since only one of each pair can be active at the same time. The power source 21 can therefore be designed for only approximately one half of the total load requirement (i.e., the "offstate or free state" power of the clutch apparatus in slippage being greater than zero). This principle applies not only in the case of antagonistic architectures but it also applies in any application where multiple outputs do not need to be actuated simultaneously at their maximum load.

When maintained in slippage and used with a geared motor as power source 21, the MR fluid clutch apparatuses 10 in the cable-driven system 30 decouple the dynamic behavior of the motor from the outputs resulting in a low output inertia and high control quality since the high output inertia of the geared motor 21 is not reflected at the system output. The cable-driven system 30 may also provide an increased force accuracy as the non-linear behaviors of the geared motor (e.g. cogging, gear backlash, friction) are filtered by the MR fluid clutch apparatuses. The cable-driven system 30 also has relatively low mass and a reduced number of components since loads generated by a common geared motor 21 can be shared between a plurality of outputs. In some applications, the cable-driven system 30 may be reliable as a faulty geared motor can be disconnected from the output following clutch disengagement, when a redundant motor is available as back-up.

Figure 4:
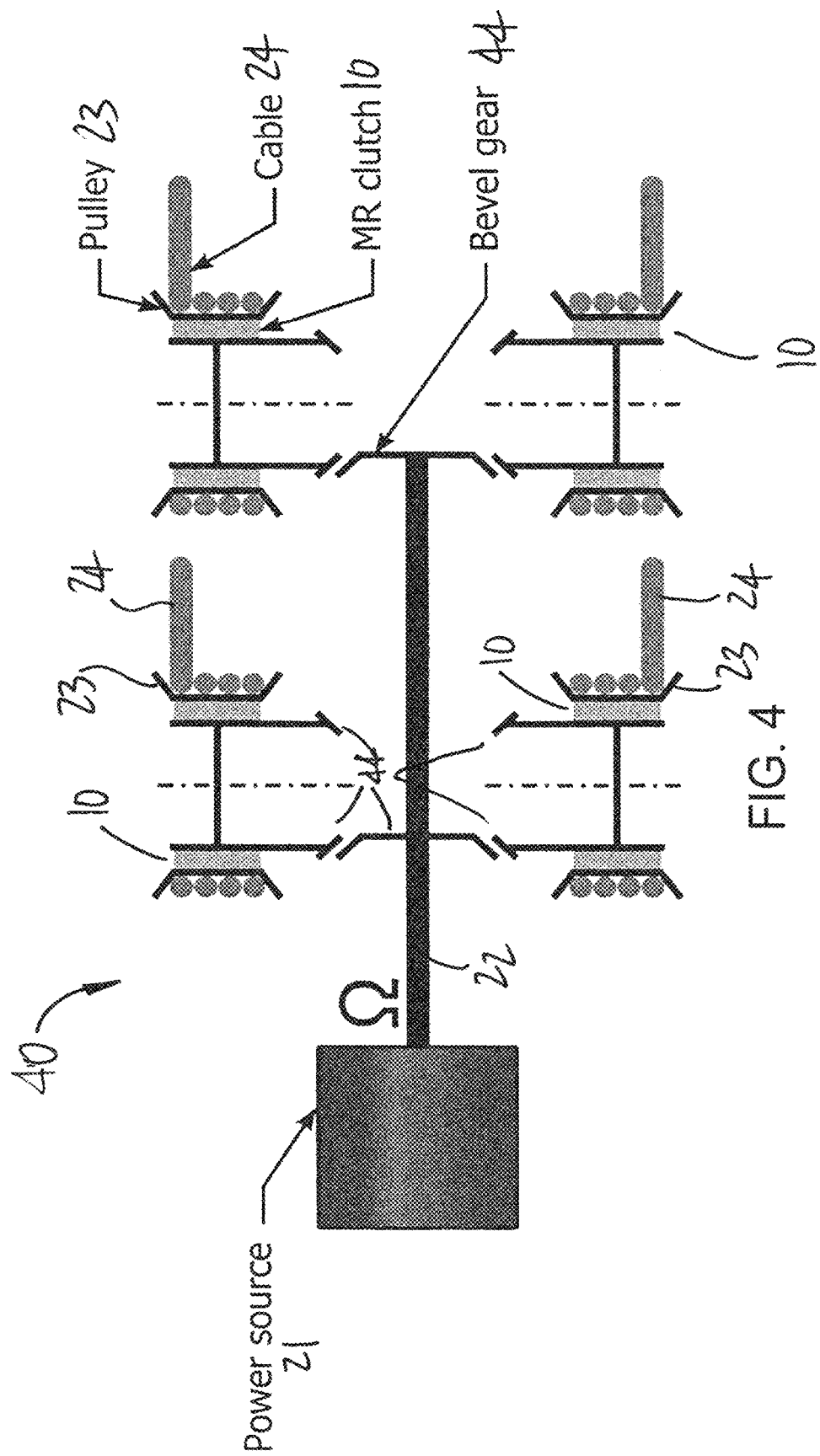
FIG. 4 is a schematic view of a cable-driven system using a common power source with magnetorheological fluid clutch apparatuses for displacement of an end effector in two rotational degrees of freedom.
Figure 5:
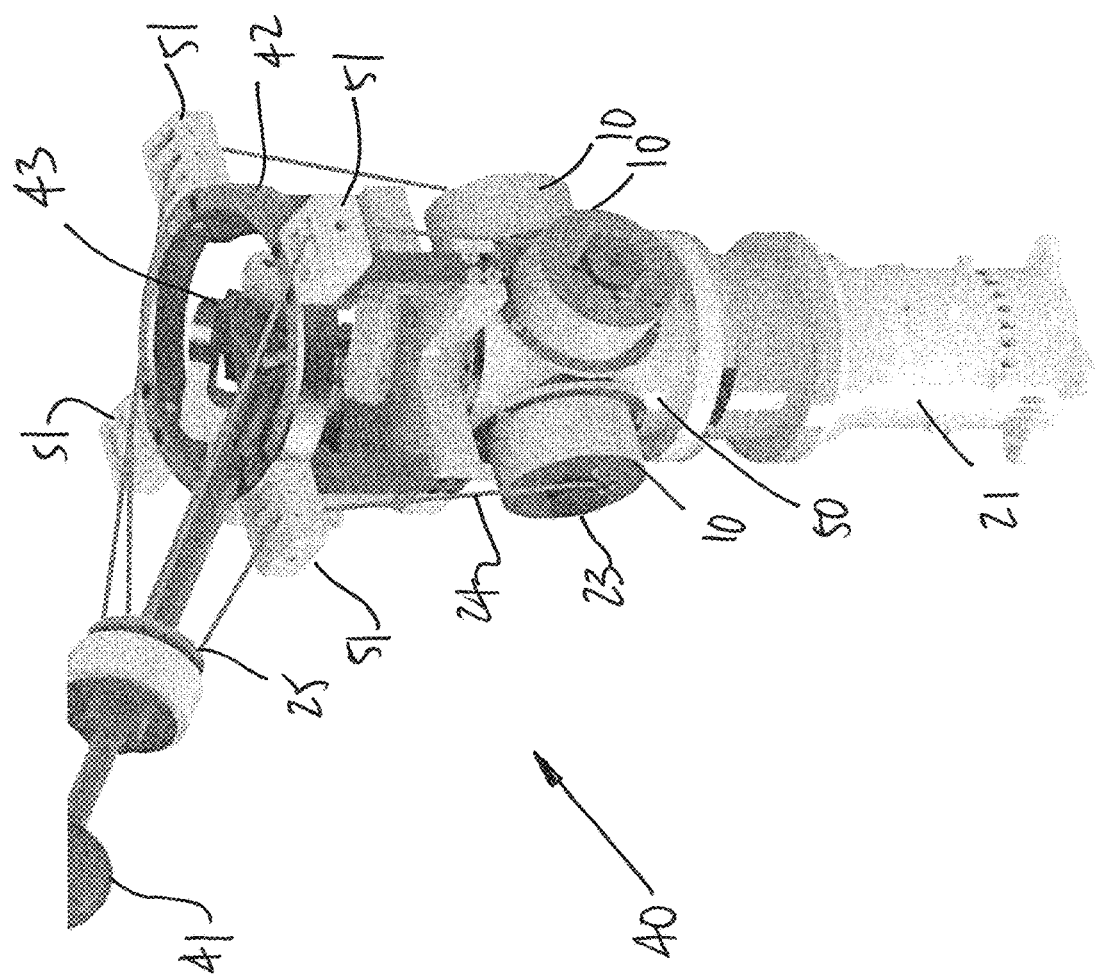
FIG. 5 is a perspective view of the cable-driven system of FIG. 4, set up with two pairs of magnetorheological fluid clutch apparatuses for antagonistic displacement of an end effector.

Referring to FIGS. 4 and 5, yet another embodiment using the concepts of the cable-systems 20 and 30 is illustrated at 40. As the cable-driven system 40 has components in common with the cable-driven system 20 of FIG. 2, like components will bear like reference numerals. The cable-driven system 40 has four MR fluid clutch apparatuses 10. The MR fluid clutch apparatuses 10 are connected to a common power source 21.

The MR fluid clutch apparatuses 10 are connected via cables 24 to a common end effector 41. The common end effector 31 is illustrated as being a rotating arm, mounted to a base 42 by a gimbal joint 43 (or other joint such as a universal joint and spherical joint). Accordingly, the end effector 41 is movable in two rotational DOFs, although other joint arrangements could be provided to constrain the end effector to movements along one translation DOFs and one rotational DOF, or two translation DOFs. In spite of being driven by the common power source 21, the MR fluid clutch apparatuses 10 provide antagonistic and complementary pulling actions on the end effector 41, to enable movement in the at least two rotational DOFs.

In the specific configuration of FIG. 5, each of the two rotational DOFs is controlled by a respective tensioning set of two antagonistic MR fluid clutch apparatuses 10 (i.e., disposed on opposite sides of the gimbal joint 43). However, it is possible to control the two rotational DOFs with only three of the MR fluid clutch apparatuses 10. Likewise, the four MR fluid clutch apparatuses 10 of FIG. 5 could be used to control three rotational DOFs, by crossing the cables 25 to control the rotational about the longitudinal axis of the end effector 41.

The cable-driven system 40 may utilize a high-speed electric motor with a high reduction ratio gearbox as the single centralized power source 21. Bevel gears 44 (enclosed in casing 50 in FIG. 5) are used to transmit the power to the driving members of the four MR fluid clutch apparatuses 10 that apply tension to the cables 24. Bevel gears 44 of antagonistic tensioning sets are coaxial and diametrically opposed relative to a drive bevel gear. Cable guides 51 may be present to route the cables 24 within a confined volume.

The cable-driven systems 30 and 40 may be adapted and optimized to match particular requirements of specific applications. For instance, an arrangement of the cable-driven system 40 could be used in an active joystick. Active joysticks are able to modulate the force-feedback to the operator in real time, as opposed to traditional passive joysticks for which the force-to-displacement characteristics cannot be changed. Active joysticks based on the cable-driven system 40 may have high dynamic response, high force capacity and be lightweight. End uses of such active joysticks based on the cable-driven systems 30 and 40 are numerous in many fields of application, including non-exclusively consumer mobility vehicles, heavy equipment, material handling equipment, medical applications (robotically-assisted surgery), aerospace, etc). In another instance, an arrangement of the cable-driven system 40 could be used as a robotic arm. In another instance, the cable-driven system 40 could be used to direct a fluid(s) of a hydraulic circuit. In another instance, of the cable-driven system 40 could be used to direct a gas in order to act as a thrust vectoring system to direct an aircraft.

Figure 6A:
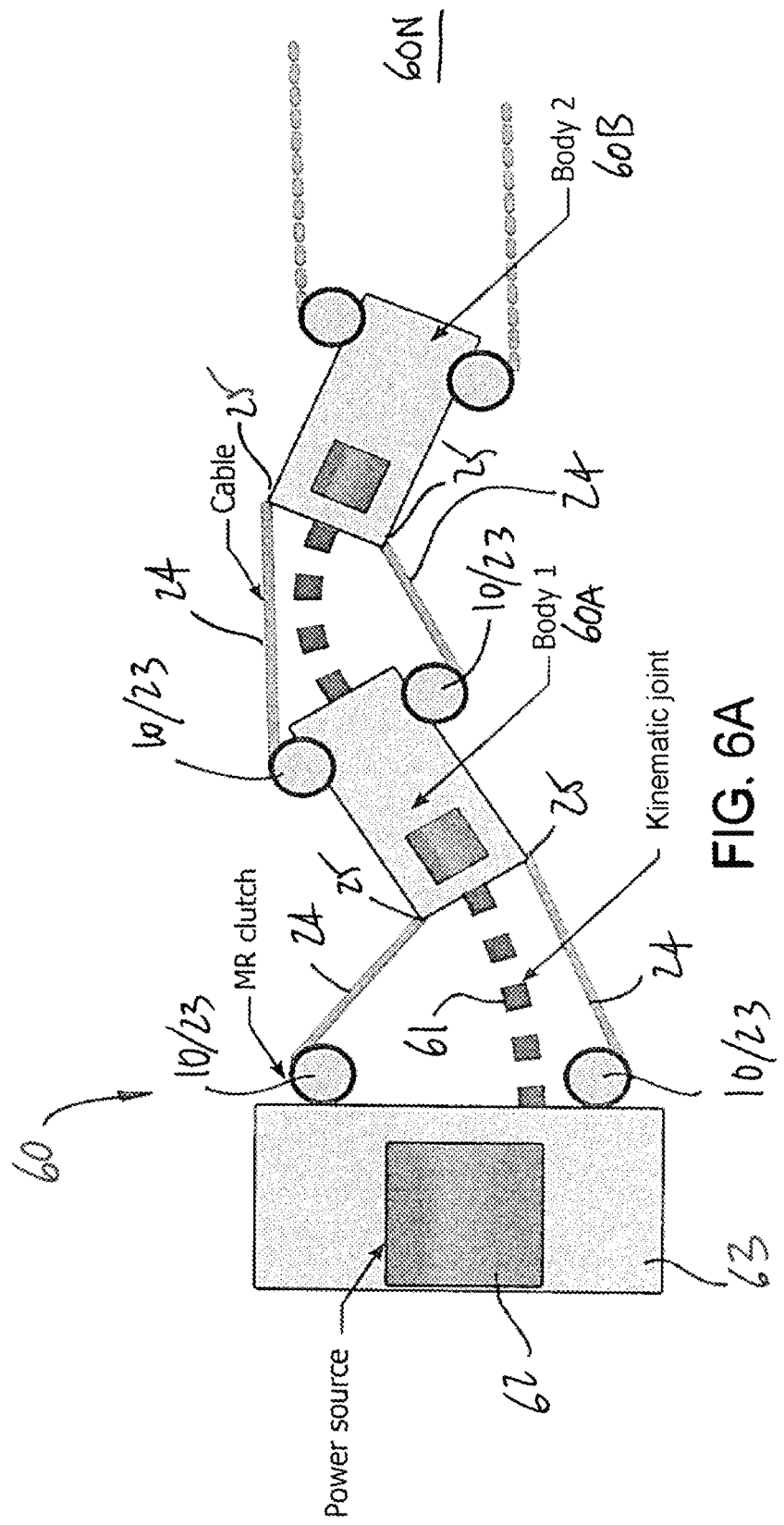
FIG. 6A is a schematic view of a cable-driven system using a common power source with a pair of magnetorheological fluid clutch apparatuses to control movements of bodies serially connected by kinematic joints, with power sources on the bodies.
Figure 6B:
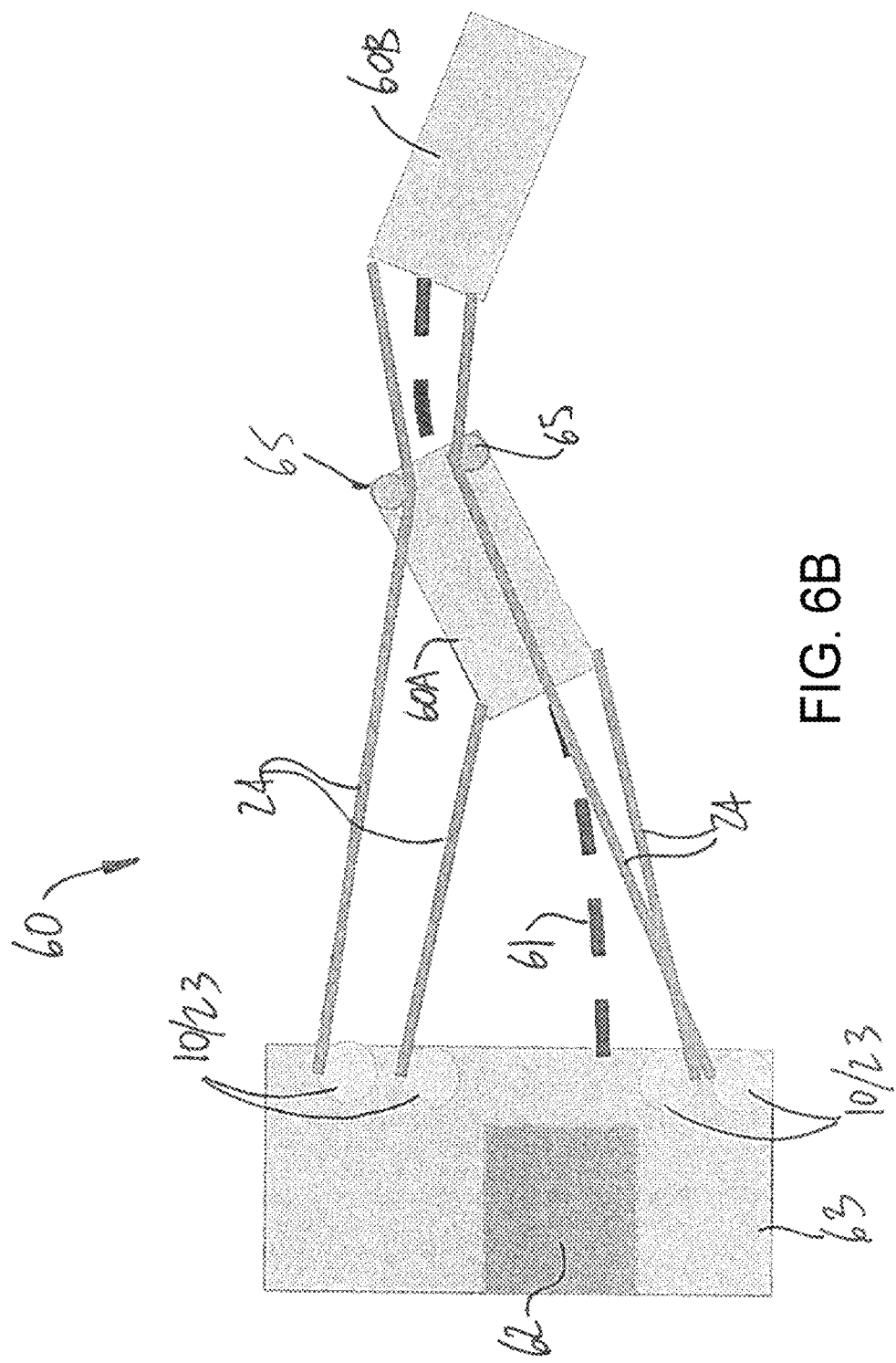
FIG. 6B is a schematic view of a cable-driven system using a common power source with a pair of magnetorheological fluid clutch apparatuses to control movements of bodies serially connected by kinematic joints, with a shared power source on a base.

Referring to FIGS. 6A and 6B, yet another embodiment using the concepts of the cable-systems 20, 30 and 40 is illustrated at 60. As the cable-driven system 60 has components in common with the cable-driven system 20 of FIG. 2, like components will bear like reference numerals. The cable-driven system 60 can be described as having bodies 60A, 60B, 60n (also commonly known as link members or linkages in robotics), being connected to each other by kinematic joints 61 (pivots, ball joints, sliders, etc.) and by limited-stiffness elements such as cables 24. The cable-driven system 60 has a power module or source 62 in a base 63. The power source 62 transmits its output to a pair of MR fluid clutch apparatus 10 each supporting an output wheel 23 and cable 24, with the MR fluid clutch apparatuses 10 being assembled to the base 63 so as to share the power output from the power source 62 (e.g., in similar fashion to the arrangements shown in FIGS. 2-5).

The free ends of the cables 24 are connected to the body 60A, so as to exert a pulling action on the body 60A. The body 60A is constrained to given movements by its connection to the kinematic joints 61, and the pulling action of the cables 24 is controlled by the actuation of the MR fluid clutch apparatuses 10 so as to selectively control movements of the body 60A. Bodies 60A, 60B, 60n may have a similar configuration as the base 63, i.e., each with its own power source 62, MR fluid clutches 10, output wheels 23 and cables 24, serially connecting the bodies 60A, 60B, 60n. Bodies 60A, 60B, 60n may also have a different configuration than that including the base 63. For example, each or a few of the bodies 60A, 60B, 60n may have MR fluid clutch apparatuses 10, output wheels 23 and cables 24, serially connecting the bodies 60A, 60B, 60n, all of the bodies with a MR fluid clutch apparatus 10 using the power coming from the base source 62 (i.e., power could be distributed by a rotating flexible shaft).

Alternatively, as shown in FIG. 6B, a single power source 62 in the base 63 may be shared by a plurality of MR fluid clutch apparatuses 10 on the base 63, with cable guides 65 on the proximal body 60A can apply tension on the distal body 60B, etc. The cable guides 65 may be idler pulleys, posts, etc.

Again, tension in the limited-stiffness elements (i.e., the cables 24) is controlled by the MR fluid clutch apparatuses 10. Hence, loads applied on the bodies 60A, 60B, 60n, and their motion relative to each other can be accurately controlled with high dynamic performance.

Figure 7A:
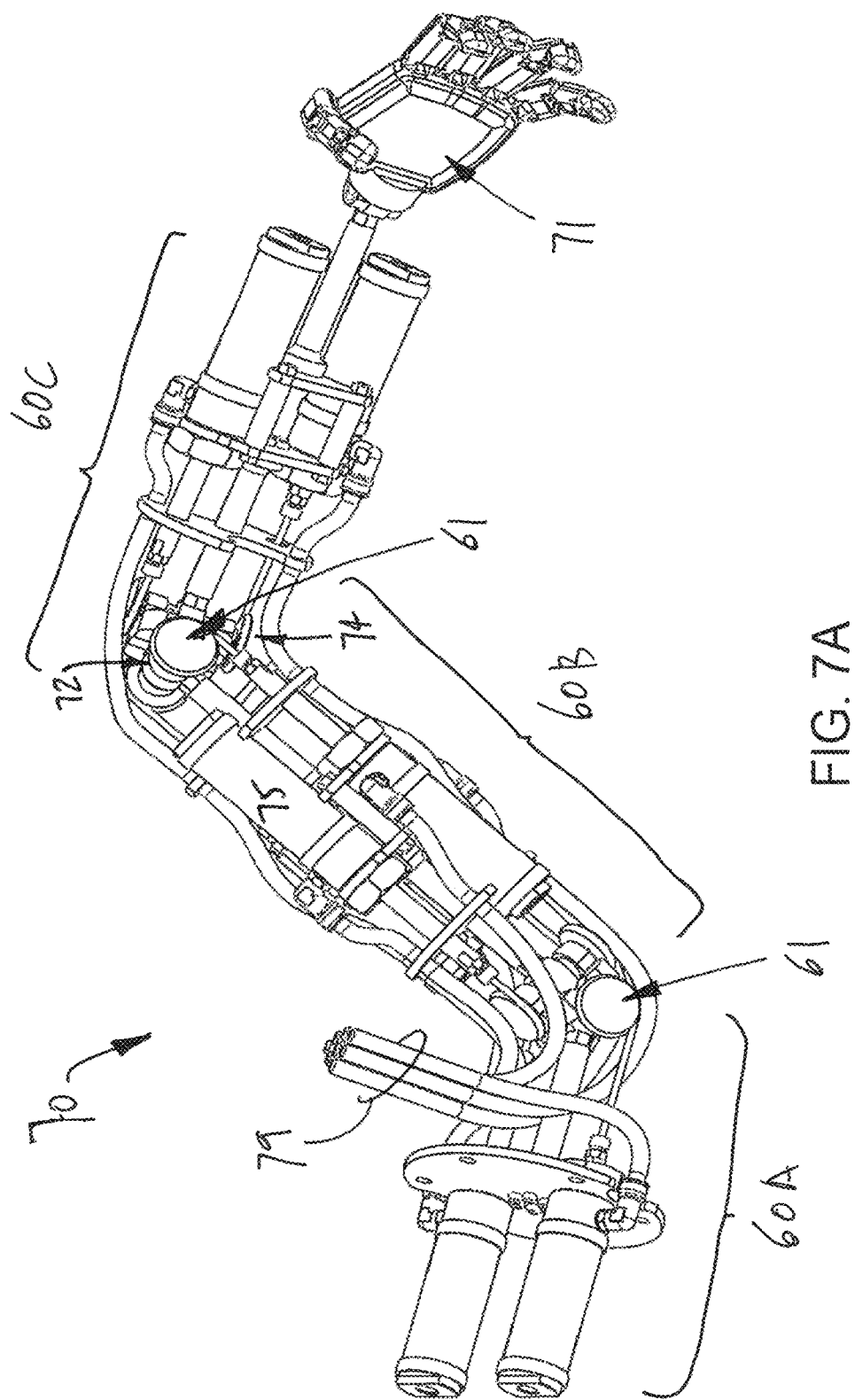
FIG. 7A is a perspective view of a robotic arm based on the system of FIGS. 2 to 6B.
Figure 7B:
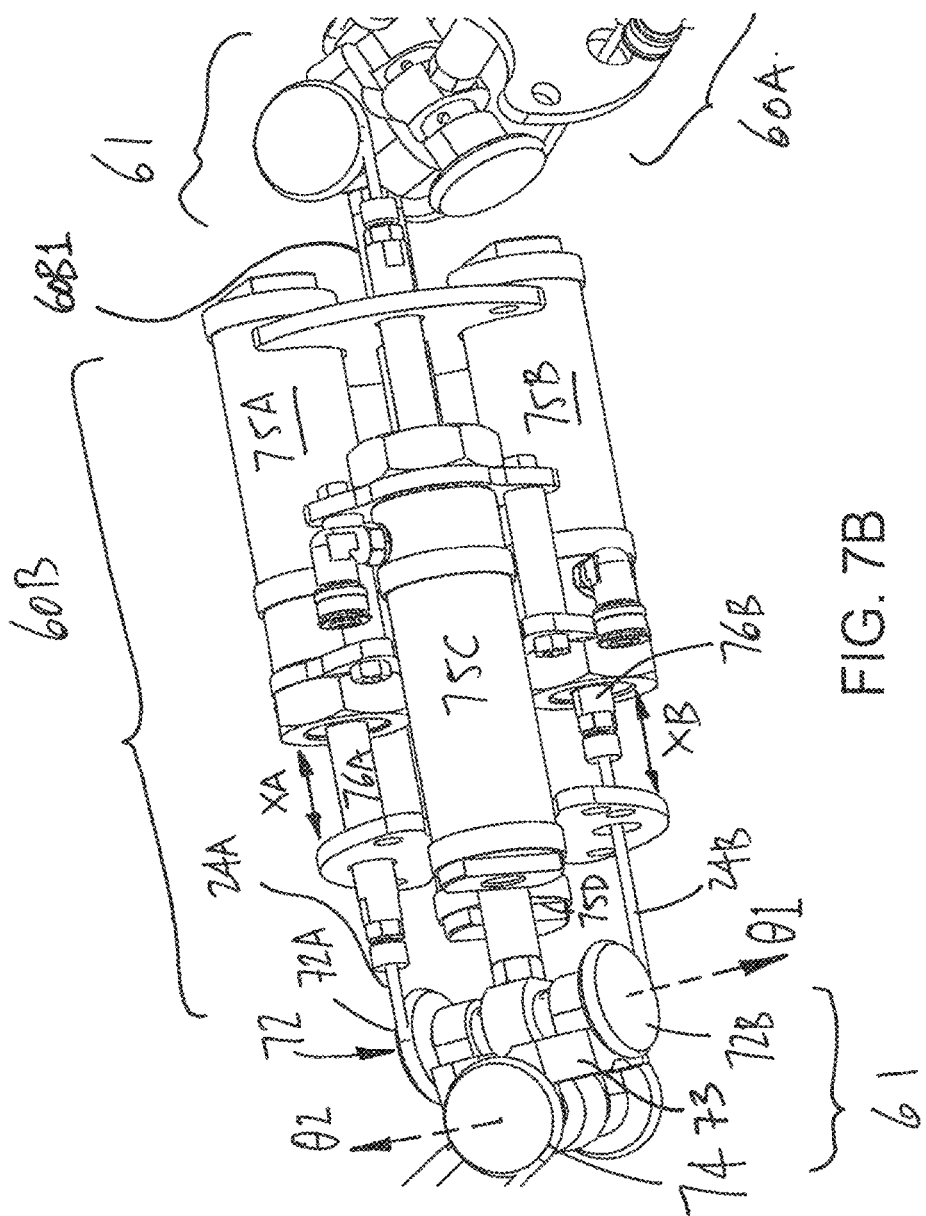
FIG. 7B is a perspective view of an intermediate body of the robotic arm of FIG. 7A.
Figure 7C:
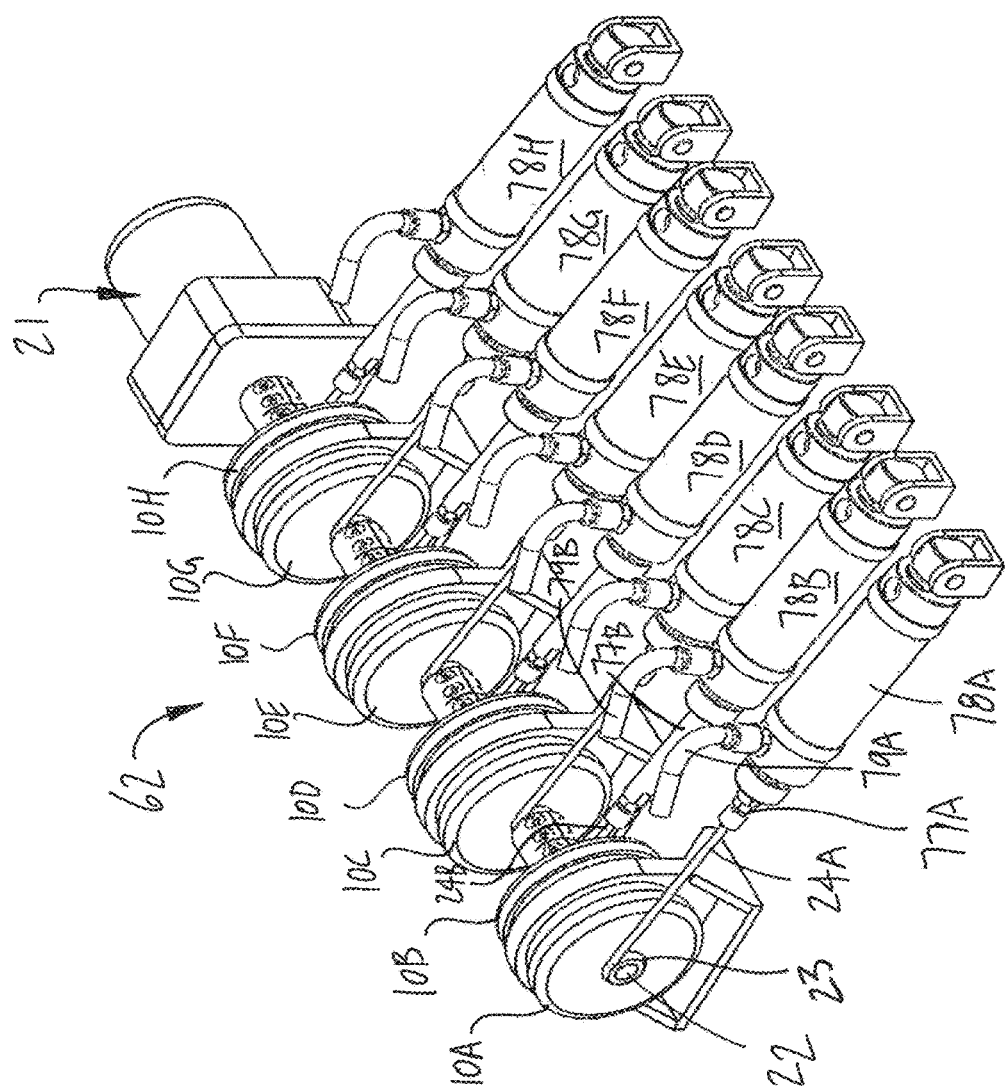
FIG. 7C is a perspective view of a power module of the robotic arm of FIG. 7A.

Referring to FIG. 7A-7C, an embodiment of the cable systems of FIGS. 6A and 6B is shown, in a robotic arm 70. The robotic arm 70 is of the type having a gripper 71 at its output end. The gripper 71 is one among numerous possible tools that may be used as the end of the robotic arm 70, and is simply provided as an example. The gripper 71 is for example actuated independently from the actuation of the robotic arm 70, as the gripper 71 need only displace its fingers, and be rotated at its wrist. For illustrative purposes, other tools that could be used as alternatives to the gripper 71 include pliers, a drill, pincers, to name but a few.

The robotic arm 70 is shown as being a 4-DOF arm with bodies 60A, 60B and 60C, in that 4 rotational DOFs are provided between the base 63 and the part of the body 60C supporting the gripper 71. Again, this is one of numerous possibilities, as it has been explained for FIGS. 6A and 6B that there may be more or fewer bodies, with more or fewer DOFs, the DOFs being translations and/or rotations.

For ease of explanation and to avoid redundancies, only the intermediate body 60B, shown in FIG. 7A as being between body 60A and 60C, is described in detail with reference to FIG. 7B, but the base body 60A and the end body 60C have similar components. The intermediate body 60B in shown being connected to the end body 60C by way of the kinematic joints 61, the kinematic joints 61 incorporating several components. The kinematic joint 61 may indeed include a first rotational joint 72 fixed to the body 60B, the first rotational joint 72 having a pair of pulleys or equivalent, 72A and 72B, both concurrently rotatable about axis θ1. The pulleys 72A and 72B are concurrently rotatable as they are fixed to one another. A rotation of the pulleys 72A and 72B will result in a rotation of carriage 73, again about axis θ1. A mirror or similar arrangement is also provided at the end of the end body 60C interfaced to the intermediate body 60B, as shown by the rotational joint 74, the carriage 73 being shared by rotational joints 72 and 74 as part of the kinematic joint 61. Therefore, the kinematic joint 61 provides two of the four rotational DOFs of the robotic arm 70, about axes θ1 and θ2, respectively by way of joint 72 and joint 74.

The pulleys 72A and 72B are respectively connected to cables or equivalents 24A and 24B, but in opposite winding orientations, such that cable 24A provides a clockwise rotation, and cable 24B provides the antagonistic counterclockwise rotation. It is contemplated to route the cables 24A and 24B directly to the MR fluid clutch apparatuses, using cable guides such as the one shown at 65 in FIG. 6B. However, the use of an hydraulic transmission is shown as an alternative. In given systems involving more DOFs and a wider range of movement, an hydraulic transmission may be a practical alternative as routing of hydraulic hoses may be less complex than cable routing.

For the rotational joint 72, the antagonistic actuation is provided by slave cylinders 75A and 75B. Slave cylinder 75A has a rod 76A displaceable along XA, to pull the cable 24A and thus rotate the pulley 72A, i.e., the components affixed with "A". Likewise, slave cylinder 75B has a rod 76B displaceable along XB, to pull the cable 24B and thus rotate the pulley 72B, i.e., the components affixed with "B". In the description, cables are used here in order to provide greater amplitude of movement. However, similarly to a mechanism described subsequently for FIG. 9, the piston rods 76A, 76B, 76C could be attached directly to the pulleys 72A, 72B, 72C, provided an appropriate joint (e.g., swivel joint) is fitted between the pistons rods 76 and the corresponding pulley 72, and provided that the cylinders 75 may rotate relative to the structural components of the body 60. Each of the slave cylinders 75A and 75B has its own dedicated MR fluid clutch apparatus 10, as shown later in FIG. 7C, providing the necessary hydraulic pressure and fluid movement to cause antagonistic force control, which may lead to controlled movements of the rotational joint 72.

FIG. 7B also shows another pair of slave cylinders 75C and 75D, oriented toward the base body 60A. The slave cylinders 75C and 75D control another rotational DOF, in the same manner as described for the rotational joint 72. The components at the right-hand side of the figures are essentially the same as on the left-hand side, whereby the operation of the right-hand side is self-explanatory. The body 60B is shown as using a frame member 60B1 to act as a rigid link between the kinematic joints 61. The body of the cylinders 75 could also be used as frame members, along with connecting plates and associated hardware. Any possible frame arrangement is considered and usable to ensure that the rotatable components, i.e., the rotational joints 72 and 74 inter alia, may rotate while their axes are fixed in position.

Referring to FIG. 7C, the generic power module 62 is illustrated as having the electric motor 21 driving the output shaft 22. The power module 62 is used to actuate and control the movements of the robotic arm 70. Advantageously, the weight of the power module 62 is not supported by the robotic arm 70, and may instead be on a separate structure, such that the robotic arm 70 need not bear the weight of the power module 62. MR fluid clutch apparatuses 10A-10H, concurrently referred to as 10, are each secured to the output shaft 22. Each MR fluid clutch apparatus 10 has a pulley or equivalent 23, about which is wound a cable or equivalent 24, in similar fashion to the previously described embodiments. By way of the cables 24, each MR fluid clutch apparatus 10 pulls on a respective rod 77 (from rods 77A-77H). The rods 77 are each associated with a master cylinder 78 (i.e., one of the cylinders 78A-78H), whereby the pull will generate an hydraulic flow or pressure supply at the hydraulic hose 79 (i.e., pipe, tube, tubing, etc). Looking at FIG. 7A, the harness of hoses 79 (i.e., 79A-79H) diverges into the individual hoses 79 each reaching an associated slave cylinder, as shown in FIG. 7A, but not in FIG. 7B in which the hoses 79 are absent to simplify the figure. For example, the master cylinders 78A and 78B in FIG. 7C may respectively be connected to the slave cylinders 75A and 75B in FIG. 7B. Hence, the master cylinders 78 convert a mechanical pull produced by the MR fluid clutch apparatuses 10 into a hydraulic pressure, the hydraulic pressure being reconverted into a mechanical pull by the slave cylinders 75, to cause the antagonistic forces and movements. The robotic arm 70 therefore benefits from the dynamic response of MR fluid clutch apparatuses 10 in its movements. The multiple DOFs of the robotic arm 70 may be actuated using a single power source, namely the motor 21, with the control of the movements provided by the selective coupling input from the MR fluid clutch apparatuses 10, operated by a controller (including a processor unit and appropriate control modules).

Each pair of antagonistic slave cylinders (e.g., the pair 75A and 75B) provide antagonistic forces, when one of the associated MR fluid clutch apparatuses, 10A, causes a pulling action by pulling on the cable 24A (and thus winding the cable 24A on the pulley 23A), the other MR fluid clutch apparatus 10B may be in controlled slippage. Controlled slippage causes a release in pressure in the hydraulic transmission and cable 24B. The cable 24B is consequently wound about the pulley 72B (FIG. 7B). Consequently, the rod 76B is pulled by the cable 24B, whereby the slave cylinder 75B becomes temporarily master to the master cylinder 78B (FIG. 7C). This results in a retraction of the rod 77B into the master cylinder 78B, and an unwinding of the cable 24B at the MR fluid clutch apparatus 10B. Therefore, as suggested previously, the electric motor 21 will not be transmitting full forces to all tensioning sets simultaneously, due to the antagonistic operation of pairs of the tensioning sets.

Figure 7D:
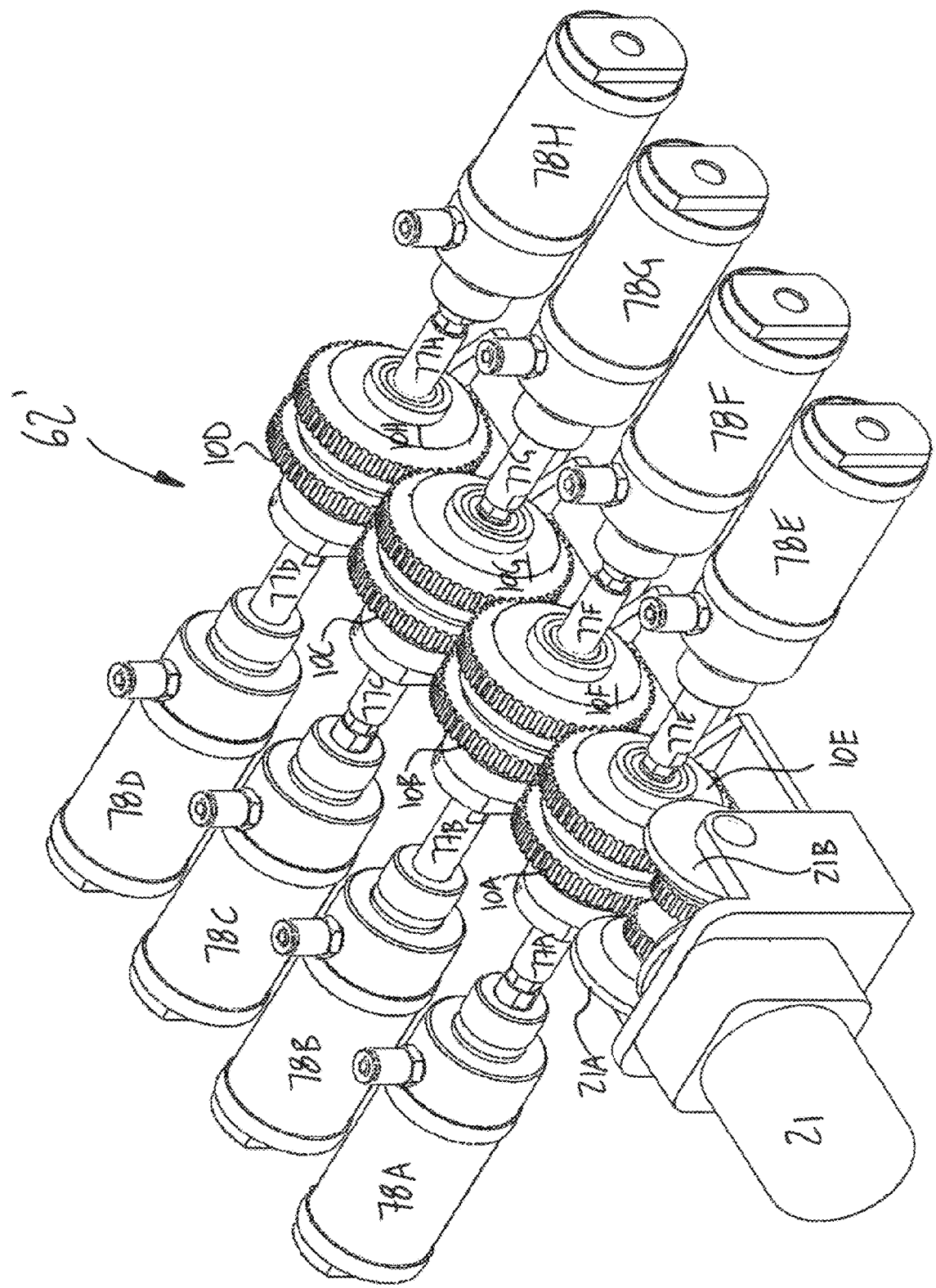
FIG. 7D is a perspective view of another embodiment of the power module of the robotic arm of FIG. 7A.
Figure 7E:
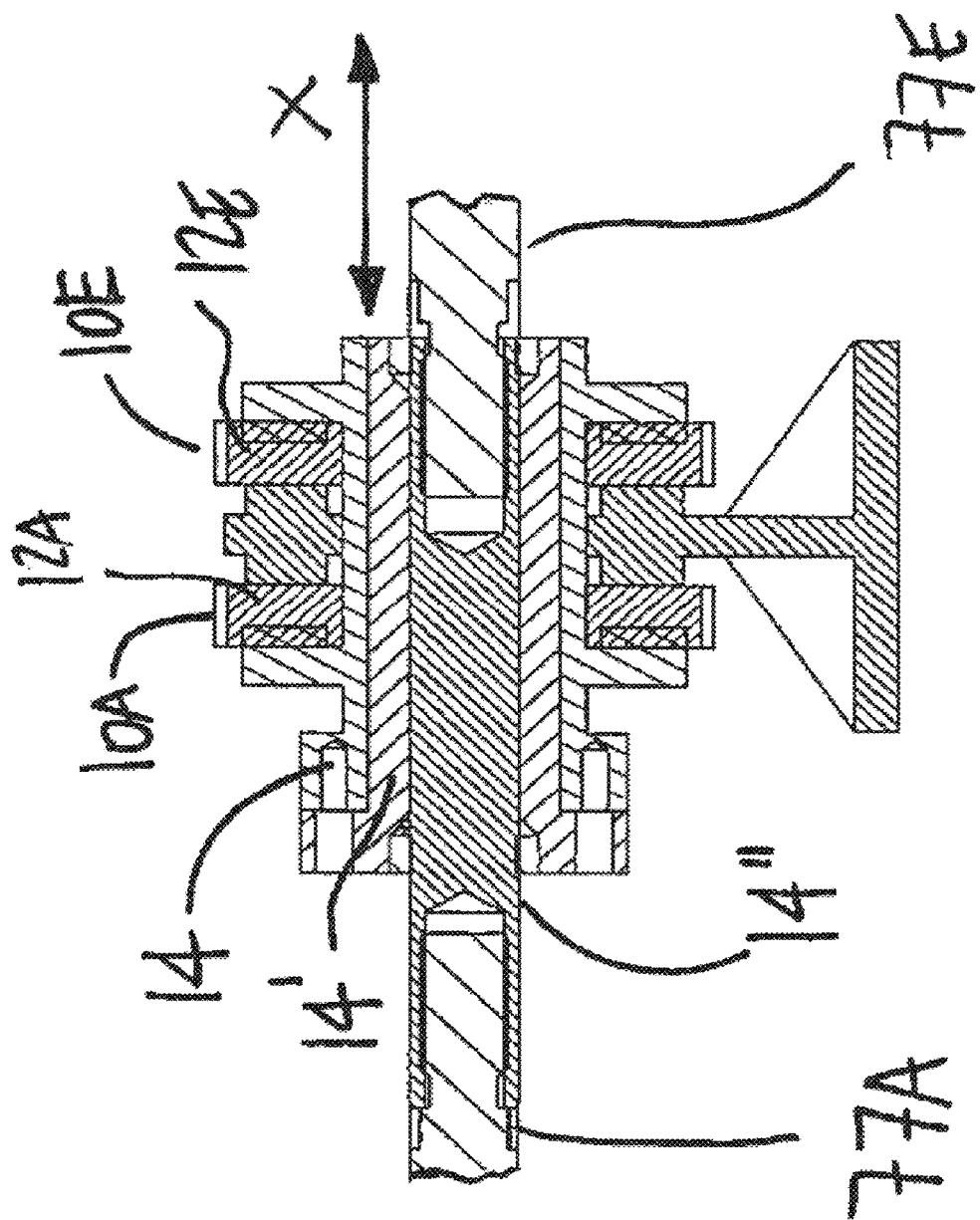
FIG. 7E is a cross-section view of the power module of FIG. 7D.

Referring to FIGS. 7D and 7E, another arrangement of the power module is illustrated as 62', and has the electric motor 21 driving the input of multiple MR clutches apparatuses 10. The power module 62' is used to actuate and control the movements of the robotic arm 70 (FIGS. 7A-7B). The MR fluid clutch apparatuses 10A-10H, concurrently referred to as 10, are each operatively connected to one another for transmission of the power input of the motor 21 to all of the MR fluid clutch apparatuses 10. The MR fluid clutch apparatuses 10 are arranged in two rows, a first row including MR fluid clutch apparatuses 10A-10D rotating in a first direction as meshed to one another, and a second row including MR fluid clutch apparatuses 10E-10H rotating in a second direction as meshed to one another, opposite the first direction. The opposite directions may be achieved by a gear arrangement featuring gear 21A for the first row, and gear 21B for the second row, receiving the single rotation output from the motor 21 to rotate in opposite directions.

As shown in FIG. 7E, each antagonistic pair of MR fluid clutch apparatuses, shown by the antagonistic pair 10A and 10E, acts on an idler nut 14' that is part of the driven member 14. The driven member 14 is shared by the antagonistic pair 10A and 10E. However, the drive member 12A will rotate the driven member 14 in a first direction, whereas the drive member 12E will rotate the driven member 14 in the opposite direction. Hence, each MR fluid clutch apparatus of an antagonistic pair (e.g., 10A/10E) act antagonistically on the idler nut 14'. The idler nut 14' may be connected to a threaded shaft 14'' or like any other rotation to translation type of mechanism, such as ball screw, that will convert the rotation from the MR fluid clutch apparatuses 10 to a reciprocating translation in direction X, reciprocating as per the opposite directions of rotation. The threaded shaft 14'' is connected at its opposed ends to the piston rods 77A and 77E acting on single action master cylinders 78A and 78E or on a double acting master cylinder (not illustrated). Piston rods 77A and 77E may only translate, its rotation about its main axis being blocked by a mechanism (not illustrated). Other power module arrangements are considered as well, the embodiment of FIGS. 7C and 7E being two illustrations of possible embodiments.

The cable-driven system described above use MR fluid clutch apparatuses in conjunction with cables and output wheels, including all other variations or embodiments of the cables and output wheels as described above.

The number of clutch apparatuses 10 required to fully constrain and control an assembly on bodies should be superior or equal to DOF+1-Number of biasing members, DOF being the number of degrees of freedom of the mechanism.

It is to be noted that a number of clutch apparatuses 10 superior to DOF+1-Number of biasing members creates a redundancy, if the clutches and the attaching points on the bodies are correctly positioned.

Figure 8:
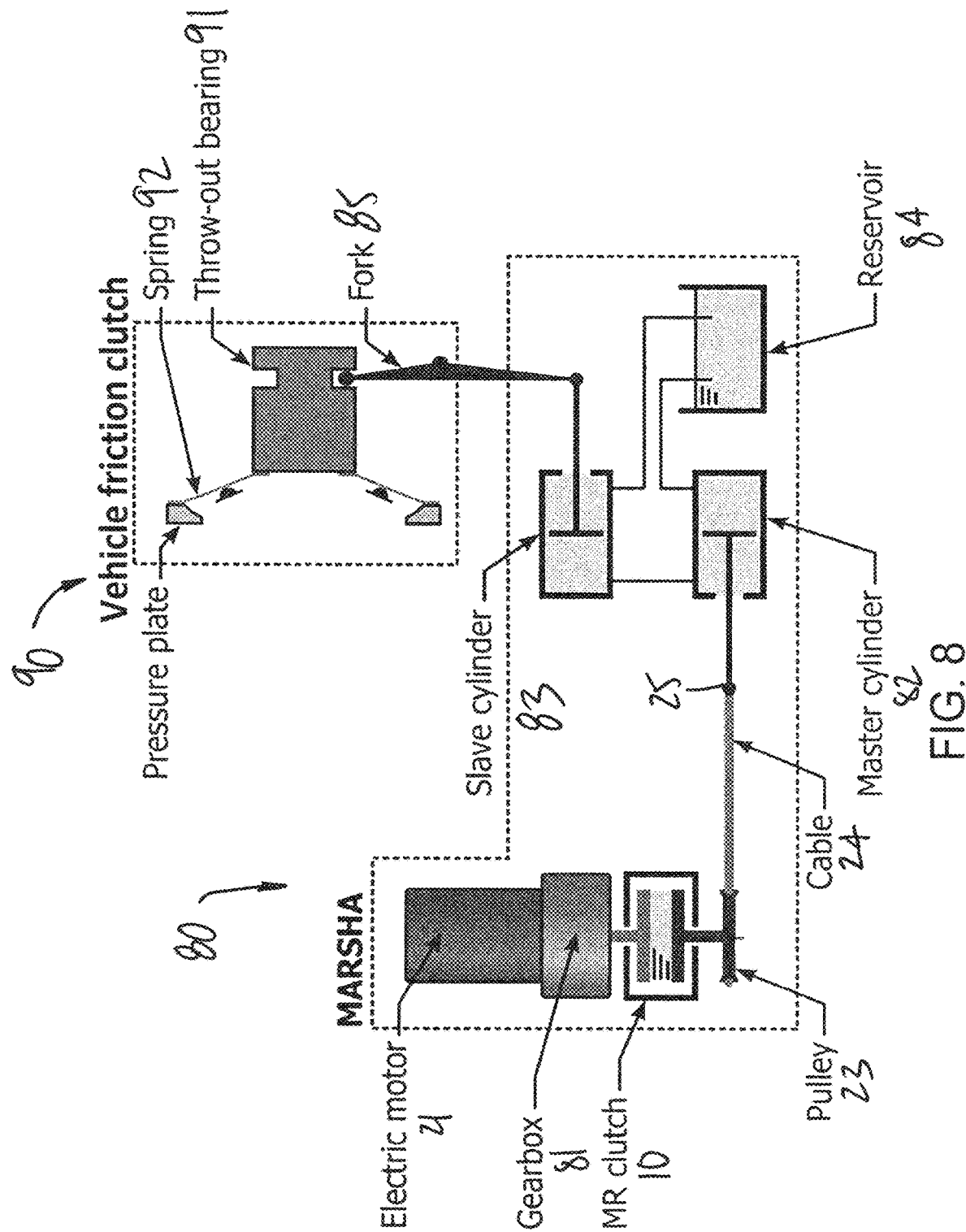
FIG. 8 is a schematic view of a magnetorheological servo hydraulic actuator system used in conjunction with a vehicle friction clutch.

Referring to FIG. 8, a magnetorheological servo hydraulic actuator system is generally shown at 80, and used in conjunction with a vehicle friction clutch, schematically shown as 90. The system 80 has components in common with the cable-driven system 20 of FIG. 2, whereby like components will bear like reference numerals, for instance for the MR fluid clutch apparatus 10, the power source 21 (e.g., an electric motor), the output wheel 23 and the cable 24. The system 80 may additionally comprise a gearbox 81. The magnetorheological servo hydraulic actuator system 80 is designed to control the torque that is being transmitted from a vehicle engine to its driving wheels through the friction clutch 90. The system 80 may be used with vehicles having manual transmissions or automated manual transmissions, for instance to eliminate the use of the clutch pedal and/or minimize gear shifting time.

In the system 80, the free end of the cable 24 is attached to the rod of a master cylinder 82. The master cylinder 82 is used to move remotely slave cylinder 83 through hydraulic hoses and reservoir 84. The slave cylinder 83 moves fork 85 to engage/disengage the vehicle's friction clutch 90.

In operation, the rotational speed of the power source 21 is typically limited to a value that ensures the required translational speed of a throw-out bearing 91 results in satisfactory system performance.

When the MR fluid clutch apparatus 10 transmits torque, the cable 24 winds around the output wheel 23, thereby pulling on the rod of the master cylinder 82. The hydraulic fluid is displaced through hoses from the master cylinder 82 to the slave cylinder 83 whose output moves the throw-out bearing 91 of the vehicle friction clutch 90, by way of the fork 85. When the current is decreased in the MR fluid clutch apparatus 10, spring 92 of the friction clutch 90 helps for its reengagement by providing an antagonistic action. The current level in the MR fluid clutch apparatus 10 is controlled and adjusted to avoid damage on the friction interfaces of the vehicle clutch 90. When the current is removed, the low friction torque of the unpowered MR clutch apparatus causes a minimal tension in the cable 24.

If this residual tension in the cable 24 is found to be too high, the system 80 may further include a constant low-force device, such as a constant torsion spring mounted on the output wheel 23, installed in parallel and referenced to the chassis to counteract any parasitic tension while not significantly impacting the on-state characteristics of the system. Such device would mitigate any impact the torque could have on the vehicle friction clutch 90 when the MR fluid clutch apparatus 10 is not powered, such as avoiding loading the throw-out bearing 91 which could otherwise reduce its life.

In the system 80, the hydraulic circuit (i.e., master cylinder 82, slave cylinder 83 and reservoir 84) are used purely as a load transmission device and the electric hardware could be located in the interior or under the hood of the car. However, a different packaging could allow removal of the hydraulic system by directly attaching the driven end of the cable 24 to the fork 85 of the vehicle friction clutch 90.

The system 80 may be used in two operation modes, "launch" and "gear shift". In "launch" mode, the role of the system 80 is to ensure an adequate traction of the tires on the road during the launch of the vehicle by controlling the torque transmitted by the friction clutch 90. In "gear shift" mode, role of the system 80 is to quickly disengage the clutch 90 when the driver initiates a gear change and smoothly reengage the clutch 90 when the gear change is completed.

The systems 20, 30, 40, 50, 60 and 80 are typically equipped with a controller (i.e., a processing unit) and output sensors to control the current sent to the MR fluid clutch apparatuses 10 to achieve the required output response. The controller therefore controls movements of an output in one or more DOFs when the systems 20, 30, 40, 50, 60 and 80 obtain the DOA. The controller controls a slippage of a first magnetorheological fluid clutch apparatus to convert at least part of the DOA into a pulling of the output in a first direction of the at least one DOF with a first tensioning member; and controls a slippage of at least a second magnetorheological fluid clutch apparatus to convert at least part of the DOA into a pulling of the output in a second direction of the at least one DOF with a second tensioning member, antagonistically to the pulling by the first magnetorheological fluid clutch apparatus. The second magnetorheological fluid clutch apparatus may be replaced by a biasing member—gravity acting on the object or the flexibility of the member are also included in the list of biasing member —, the biasing member not controllable but nonetheless offering an antagonistic action to the first magnetorheological fluid clutch apparatus 10. The DOA may be obtained from a common power source for all of the magnetorheological fluid clutch apparatuses. In some of the systems, the output has two DOFs, such that controlling the slippage of the first and the second magnetorheological fluid clutch apparatuses is to antagonistically pull the output in a first of the DOFs, while the slippage of third and the fourth of the magnetorheological fluid clutch apparatuses is controlled to antagonistically pull the output in a second of the DOFs.

Figure 9:
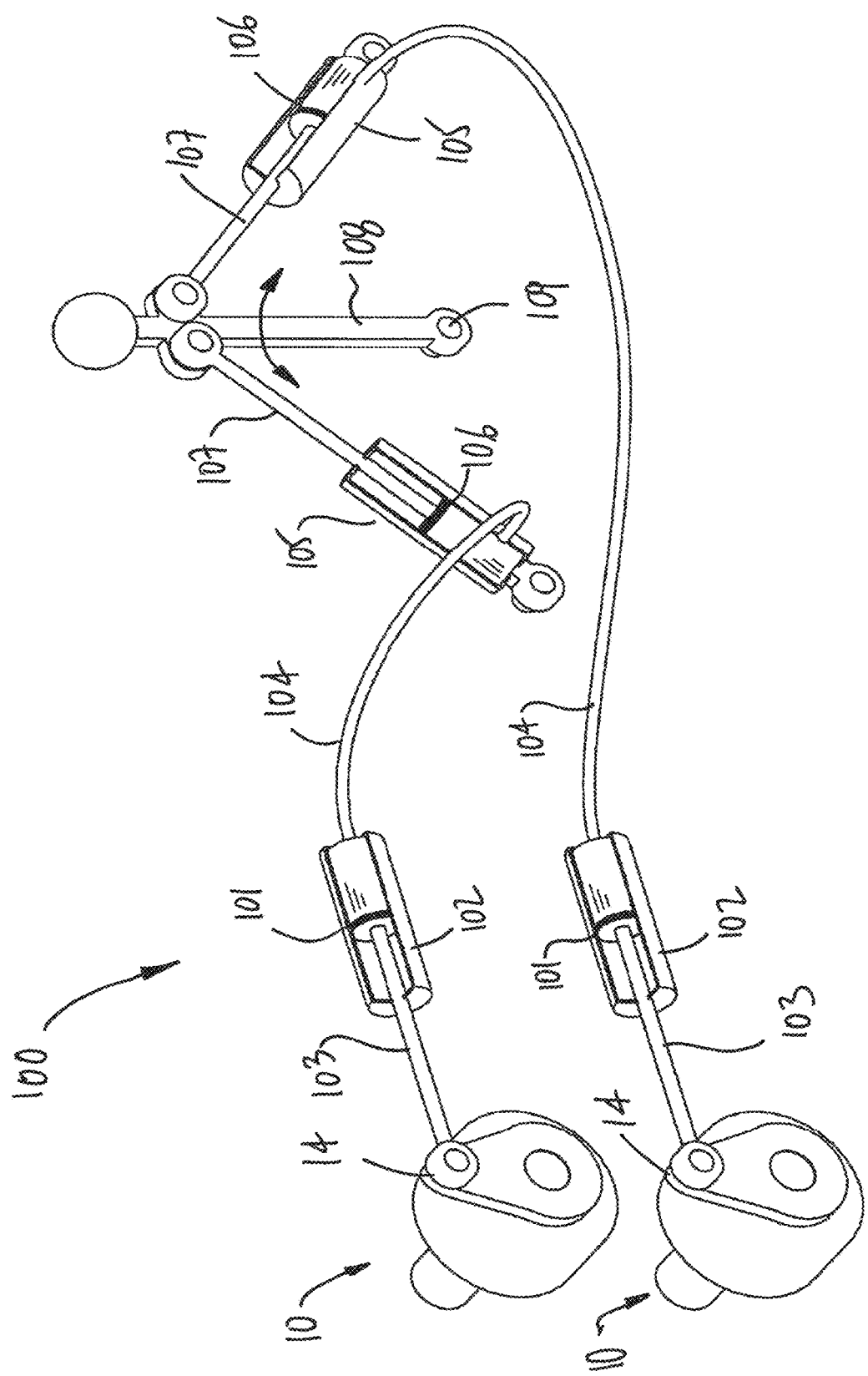
FIG. 9 is a schematic view of a fluid-driven system using a common power source with a pair of magnetorheological fluid clutch apparatuses for antagonistic displacement of an end effector.

Referring to FIG. 9, a system operated with a similar antagonistic approach is shown at 100. However, instead of cables, the system 100 uses fluid pressure to actuate movements of an output, by way of hydraulic transmission units, similar to those employed in the robotic arm 70 of FIGS. 7A-7C. In the illustrated embodiment, the system 100 has a pair of MR fluid clutch apparatuses 10 which, although not shown, may receive power from a common power source, for instance as in FIG. 2 or in FIG. 4. However, for simplicity, the power source and associated transmission is not illustrated in the FIG. 9. The driven member 14 of each MR fluid clutch apparatus 10 is an arm pivotally connected to a piston 101 of a master cylinder 102, by way of a rod 103. The system 100 may further have a flexible hose 104 extending from the master cylinder 102 to another cylinder, the slave cylinder 105. This slave cylinder 105 has a piston 106 and its rod 107 pivotally connected to an output 108 pivotally mounted to a ground at pivot 109.

In operation, the actuation of one of the MR fluid clutch apparatuses 10 results in movement of its associated piston 101 in the respective master cylinder 102. Pressurized fluid may as a result travel from the master cylinder 102, through the hose 104, and into the slave cylinder 105. This will cause a movement of the piston 106 that will push the output 108. The actuation of the other of the MR fluid clutch apparatuses 10 may result in a reciprocating movement of the output 108, in this illustrated embodiment of one rotational DOF.

Accordingly, the system 100 operates in a similar antagonistic approach as the systems 20, 30, 40, 50, 60, 70 and 80, yet with a pushing action (compressive load) instead of a pulling action (tensioning load) as when cables are used, whereby the system 100 has compressive sets as opposed to tensioning sets. The system 100 may be arranged to provide additional degrees of freedom of output, for example with an arrangement similar to that of FIGS. 4, 5, 6 and 7. As an alternative to the presence of two MR fluid clutch apparatuses 10 in FIG. 9, the system 100 may use other forces to perform the antagonistic opposition, such as a spring, gravity, etc, against the action of one of the MR fluid clutch apparatuses 10.

It is to be noted that both hoses could be plugged in different chambers of a same piston body, at the input or the output, the antagonistic opposition being applied on the piston, the rod transmitting the force to the end effector.

In yet another embodiment, it is considered to provide a pair of one tensioning set (e.g., as in systems 20, 30, 40, 50, 60, 70 and 80) with one compressive set (e.g., as in system 100), to provide antagonistic forces on a same DOF of an output. Among possibilities offered by such an arrangement, the anchor point for the tensioning set and the compressive set can be on the same side, same area and/or same location on the output. This may be a valuable features when space in scarce on one side of the output.

Any one of these systems 20, 30, 40, 50, 60, 80 and 100 may use a brake that can immobilise the output in the driven position for an extended period of time without having to activate the MR fluid clutch apparatus 10 that leads to the driven position. The purpose of this is to limit the wear of the MR fluid in the MR fluid clutch apparatus 10 while the system is under the influence of a spring force or external force while the system is kept in an immobile state.

The invention claimed is:

1. A compressing set comprising:
   a magnetorheological fluid clutch apparatus configured to receive a degree of actuation (DOA), the magnetorheological fluid clutch apparatus being actuatable to selectively transmit the DOA by controlled slippage;
   a master cylinder connected to magnetorheological fluid clutch apparatus to convert actuation thereof into hydraulic pressure,
   a slave cylinder adapted to transmit the hydraulic pressure to an output; and
   an hydraulic hose between the master cylinder and the slave cylinder for transmission of hydraulic pressure therebetween.

2. A system comprising:
   at least one of the compressing set according to claim 1; and
   means configured to provide a force on the output antagonistic to a transmission of the hydraulic pressure of the at least one compressing set on the output.

3. The system according to claim 2, wherein the means for providing the force is another one of the compressing set.

4. The system according to claim 3, wherein all of the compressing sets are configured to share a single power source providing the DOA.

5. The system according to claim 2, wherein the means for providing the force is a biasing member.

6. The system according to claim 2, further comprising a brake system adapted to lock the output in a desired position while not in a free state mode.

7. The system according to claim 2, further comprising:
   the output, the output being constrained to movement along at least one degree of freedom (DOF);
   the power source providing the DOA, the DOA being a rotational DOA;
   whereby movement of the output in the at least one DOF is actuated by controlling an actuation of the magnetorheological fluid clutch apparatus of the at least one compressing set.

8. The system according to claim 2, wherein the output is a mechanism formed of bodies interconnected by joints, the output being constrained by a number of the compressing sets at least equal to DOF+1-Number of biasing members, DOF being the number of degrees of freedom of the mechanism.

9. The system according to claim 2, wherein the means for providing the force is a tensioning set including another magnetorheological fluid clutch apparatus configured to receive a degree of actuation (DOA) and connected to the output, the other magnetorheological fluid clutch apparatus being actuatable to selectively transmit the received DOA through the output member by controlled slippage; and a tensioning member being connected to the output so as to be pulled by the output upon actuation of the other magnetorheological fluid clutch apparatus, a free end of the tensioning member adapted to exert a pulling action transmitted to an output when being pulled by the output member.

10. The system according to claim 9, wherein the output member and the tensioning member are any one of a wheel or pulley and cable or tendon, and a chainring and chain.

* * * * *